Feb. 11, 1941. J. HOFF 2,231,472
ANIMAL TRAP
Filed Sept. 27, 1939
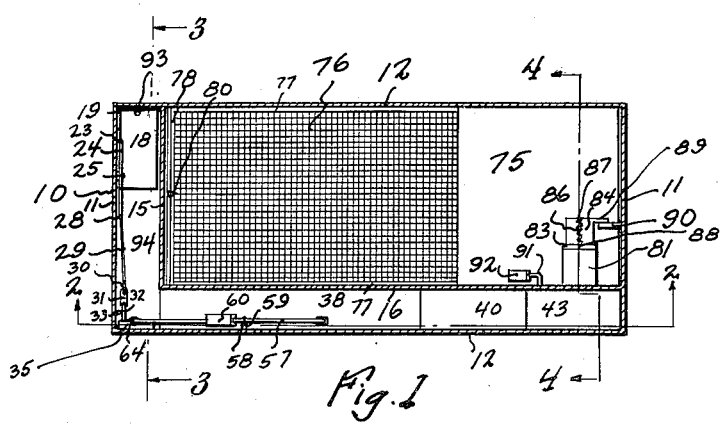
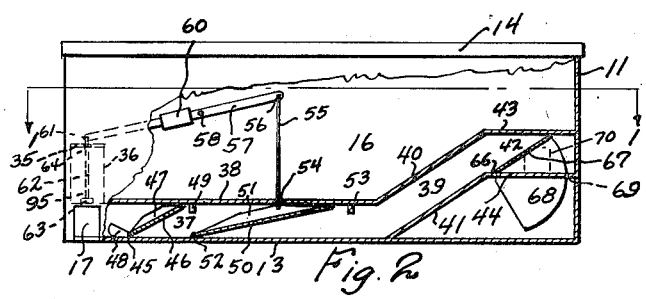
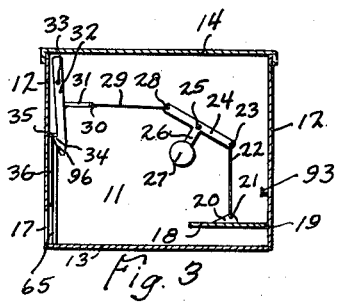
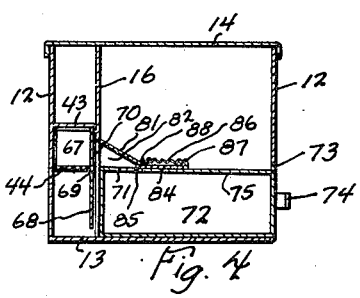
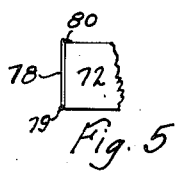
INVENTOR.
Jacob Hoff.
BY
Sam J. Slotsky
ATTORNEY Patented Feb. 11, 1941

2,231,472

UNITED STATES PATENT OFFICE 2,231,472

ANIMAL TRAP

Jacob Hoff, Yankton, S. Dak.

Application September 27, 1939, Serial No. 296,711

4 Claims. (Cl. 43—76)

My invention relates to an improved and simple animal trap for entrapping animals.

An object of my invention is to entrap the same in as humane a manner as possible without killing or injuring them.

A further object of my invention is to provide a trap which will catch any number of such animals and which provides automatic means for allowing entrance to the trap after successive animals have passed therein.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view taken generally along the line 1—1 of Figure 2,

Figure 2 is a section taken generally along the line 2—2 of Figure 1,

Figure 3 is a section taken along the line 3—3 of Figure 1,

Figure 4 is a sectional view taken along the line 4—4 of Figure 1,

Figure 5 is a detail of the end of the removable drawer.

My invention comprises the rectangular box 10 having end walls 11 and side walls 12, a bottom wall 13 and an upper lid 14. A further vertical partition 15 extends along the width of the container and on the inside thereof where it merges with the inside partition 16 which runs along the length of the box.

A small opening is provided at 17 which opening is cut in the further wall 12. A treadle 18 is pivoted at 19 to the rear wall 12 and includes the lip 20 to which is attached at 21 the link or wire 22 which is attached at 23 to the substantially T shaped member 24 which is pivoted at 25. The portion 26 of the T shaped member is attached to the counter-weight 27. Attached at 28 to the member 24 is the further link or wire 29 which is attached at 30 to the extending portion 31 of the trigger 32. The trigger 32 is pivoted at 33 to the side wall 11 and is spaced therefrom by means of a suitable spacer as shown in Figure 1. The trigger member 32 includes the small indent portion 34 which is adapted to underlie the flange 35 in the vertically movable door 36.

A further passage is provided at 37 between the bottom of the container and an upper member 38 which passage extends to the further passage 39 having the upper member 40 and the lower member 41 which passage again terminates in the further horizontal passage 42 having upper and lower members 43 and 44 respectively. Pivoted at 45 to the bottom 13 is the treadle 46 which is bent upwardly into two sides 47. A counter-weight 48 maintains the treadle in the elevated position shown normally. A downwardly projecting member 49 is attached to the upper wall 38. A further treadle 50 which also includes a pair of upwardly bent sides 51 is pivoted at 52. A further downwardly projecting member 53 is also attached to the member 38 adjacent the further treadle 50. Attached at 54 to one side 51 of the treadle 50 is the link 55 which is attached at 56 to one end of the lengthened lever 57 which is pivoted at 58 and spaced at 59 from the side wall 12. A counter-weight 60 is attached to the lever 57 as shown. The lever 57 is attached at 61 to a downwardly projecting bar 62 which terminates in the expanded or enlarged portion 63. The bar 62 passes through a suitable opening 64 in the flange 35 (see Figures 1 and 2).

Suitable guide members 65 are positioned at each side of the door 36 to guide the same. Pivoted to the member 44 at the upper end of the channel at 66 is the further treadle 67 which includes a downwardly projecting flap 68 which is at right angles to the treadle 67. The flap 68 moves within a slot 69 which is adjacent the vertical wall 16 and is cut through the base 44. The flap 68 is thus bent at right angles to the treadle 67 and is adapted to slide against the wall 16. A small opening 70 is provided in the side wall 16 (see Figures 2 and 4) which opening is adapted to communicate with a further opening 71 in the top of the removable drawer 72. The drawer 72 slides through an opening 73 and includes the handle 74 for withdrawing the same. The drawer 72 includes the top portion 75 which extends partially across the top of the drawer and the major portion of the same includes the screen 76 which is attached to side strips 77. The inner end of the drawer includes the flap 78 (see Figure 5) which is pivoted at 79 to the base of the drawer and includes a small clip 80 for attaching the top firmly to the drawer.

An inclined top wall 81 (see Figures 1 and 4) having side walls 82 covers the openings 70 and 71 and the member 81 includes a small extending horizontal flange 83. A slidable door 84 slides within the opening 85 beneath the flange 83. A spring 86 is attached at 87 to the slidable door and at 88 to the flange 83. The slidable door 84 includes a projection 89, which is adapted to bear against the pin 90 which pin is attached to the side wall 11. The projecting rod 66 of the treadle 67 passes through the wall 16 and terminates in the bent arm 91 which is attached to the counter-weight 92 which counter-weight is positioned upwardly and angularly from the top portion 75 so that it will not interfere with the same and it will still function as a counter-weight.

Now that the parts have been explained I shall explain the operation thereof. Normally the door 36 is in elevated position as shown in Figure 3 leaving the opening 17 completely open. The animal passes through the opening 17 and is immediately attracted to the bait 93 which is attached to the rear wall 12 as shown. As soon as the animal jumps upon the treadle 18 the same is depressed by the weight of the creature and pivots the member 24 and pulls the link 29 so that the indent 34 is released from beneath the flange 35 allowing the door 36 to drop and close the opening 17. The creature then returns along the passage 94 (see Figure 1) and since the opening 17 is closed, will proceed along the passageway 37. The creature then steps upon the treadle 46 which causes the same to fall to the horizontal position and the animal is then retained rearwardly of the member and cannot return toward the opening.

The downwardly projecting member 49 prevents interference with the treadle 46. As soon as the animal steps off the treadle 46 the counter-weight brings it to the normal position. The creature then steps upon the treadle 50 which automatically pulls the link 55 downwardly and through the medium of the lever 57 the bar 62 is raised and the expanded portion 63 then pulls the door 36 upwardly. It will be understood that the flange 35 is at the approximate position 95 when the door is closed and the drawing as shown in Figure 2 shows the door in fully open position after it has been raised. After the creature travels off of the treadle 50 the counter-weight 60 will bring the lever to the position as shown in Figure 2 with the door fully opened since during such opening the flange 35 will travel past the sloping portion 96 of the trigger 32, onto the indent 34 so that the door 36 will be again retained in such open position. The upwardly extending side flanges 47 and 51 prevent the creature from sticking its paws down the side of the treadle and jamming the same.

By this time the animal is completely trapped and although the opening 17 is free for the next animal it will be impossible for the preceding creature to escape. The creature then passes up the passage-way 39 and into the passage-way 42 and upon the treadle 67. The weight of the creature will swing the treadle 67 to horizontal position leaving the opening 70 clear and the animal passes through the opening 70 down into the drawer 72, and as soon as the creature leaves the treadle 67 the counter-weight will swing it back in to the position shown in Figure 2 with the member 68 closing the opening 70. The creature is now retained within the drawer 72 and cannot escape therefrom and the screen 76 is provided to insure proper ventilation within the drawer. The drawer thus provides means for entrapping any number of mice, or any other creatures, the spirit of the invention being such as to involve the trapping of any type of animal regardless of the size thereof.

It will be noted that the spring 86 normally has a tendency to pull the slidable door 84 to cover the opening 71. When the drawer is pulled out by means of the handle 74 the spring will automatically pull the door 84 over the opening closing the same since the pin 90 will not then abut against the extension 89 of the door 84. This opening is then closed so the creature cannot escape. After the drawer is removed the flap 78 is opened and the animals are emptied into any suitable means for drowning or otherwise getting rid of the same. The flap is then closed and the drawer is reinserted into the container. During the insertion of the drawer since the portion 89 will strike against the pin 90 during the inward sliding of the drawer, the flap 84 will then be again opened into the open position leaving the opening 71 clear.

It will now be seen that I have provided a trap which will entrap animals in a humane manner, which provides automatic means for allowing entrance of successive creatures, which will allow trapping of several creatures without resetting and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. An animal trap having side, top, and bottom walls, a passageway within said walls running transversely of the trap, a further longitudinal passage communicating with said transverse passage, said longitudinal passage having a rear exit opening, a drawer communicating with said opening, said drawer being slidably removable from said trap and having an opening communicating with said first mentioned opening, means for closing said drawer opening when the drawer is removed, including a spring urged door member adapted to cover said opening, a pin attached within said trap cooperant with said door to cause release thereof when the drawer is removed.

2. An animal trap having side, top, and bottom walls, a passageway within said walls running transversely of the trap, a further longitudinal passage communicating with said transverse passage, said longitudinal passage having a rear exit opening, a drawer communicating with said opening, said drawer being slidably removable from said trap and having an opening communicating with said first mentioned opening, means for closing said drawer opening when the drawer is removed, including a spring urged door member adapted to cover said opening, a pin attached within said trap cooperant with said door to cause release thereof when the drawer is removed, a treadle pivotally mounted in said longitudinal passageway including a downwardly bent flange adapted to cover the rear opening in said passageway when the treadle is raised, a counter-weight attached to said treadle to keep the same in elevated position normally.

3. An animal trap having side, top, and bottom walls, a passageway within said walls running transversely of the trap, a further longitudinal passage communicating with said transverse passage, said longitudinal passage having a rear exit opening, a drawer communicating with said opening, said drawer being slidably removable from said trap and having an opening communicating with said first mentioned opening, means for closing said drawer opening when the drawer is removed, including a spring urged door member adapted to cover said opening, a pin attached within said trap cooperant with said door to cause release thereof when the drawer is removed, a treadle pivotally mounted in said longitudinal passageway including a downwardly bent flange adapted to cover the rear opening in said passageway when the treadle is raised, a counterweight attached to said treadle to keep the same in elevated position normally, said longitudinal passageway including further treadles, a further entrance for receiving animals including a door covering operated by one of said treadles, said treadles having upwardly extending side flanges adjacent the walls of said passageway.

4. An animal trap having side, top, and bottom walls, a passageway within said walls running transversely of the trap, a further longitudinal passage communicating with said transverse passage, said longitudinal passage having a rear exit opening, a drawer communicating with said opening, said drawer being slidably removable from said trap and having an opening communicating with said first mentioned opening, means for closing said drawer opening when the drawer is removed, including a spring urged door member adapted to cover said opening, a pin attached within said trap cooperant with said door to cause release thereof when the drawer is removed, a treadle pivotally mounted in said longitudinal passageway including a downwardly bent flange adapted to cover the rear opening in said passageway when the treadle is raised, a counterweight attached to said treadle to keep the same in elevated position normally, said longitudinal passageway including further treadles, a further entrance for receiving animals including a door covering operated by one of said treadles, said treadles having upwardly extending side flanges adjacent the walls of said passageway, said transverse passageway including a treadle, means operable between the last mentioned treadle and the door to cause the door to drop when the weight of an animal rests upon said treadle.

JACOB HOFF.